(12) United States Patent
Ford (10) Patent No.: US 9,085,421 B2
(45) Date of Patent: Jul. 21, 2015

(54) SYSTEMS AND METHODS FOR SELECTING AND GROUPING PRODUCTS

(71) Applicant: Graphic Packaging International, Inc., Atlanta, GA (US)

(72) Inventor: Colin P. Ford, Woodstock, GA (US)

(73) Assignee: Graphic Packaging International, Inc., Atlanta, GA (US)

( * ) Notice: Subject to any disclaimer, the term of this patent is extended or adjusted under 35 U.S.C. 154(b) by 83 days.

(21) Appl. No.: 13/969,067

(22) Filed: Aug. 16, 2013

(65) Prior Publication Data

US 2014/0061000 A1 Mar. 6, 2014

Related U.S. Application Data

(60) Provisional application No. 61/743,352, filed on Aug. 31, 2012.

(51) Int. Cl.
| | | |
|---|---|---|
| *B65G 47/26* | (2006.01) | |
| *B65G 47/08* | (2006.01) | |
| *B65G 47/82* | (2006.01) | |
| *B65G 47/88* | (2006.01) | |

(52) U.S. Cl.
CPC ............ *B65G 47/261* (2013.01); *B65G 47/086* (2013.01); *B65G 47/82* (2013.01); *B65G 47/8823* (2013.01)

(58) Field of Classification Search
CPC .... B65G 47/082; B65G 47/29; B65G 47/295; B65G 47/086; B65G 47/261; B65G 47/266; B65G 47/82; B65G 47/8823

USPC .......... 198/419.1, 418.7, 429, 426, 436, 456, 198/458

See application file for complete search history.

(56) References Cited

U.S. PATENT DOCUMENTS

| | | | | |
|---|---|---|---|---|
| 3,311,217 | A | * | 3/1967 | Muhlenbruch ............... 198/429 |
| 3,388,815 | A | * | 6/1968 | Lingl ......................... 414/791.4 |
| 3,469,673 | A | | 9/1969 | Gentry |
| 4,018,324 | A | | 4/1977 | Kamphues |
| 4,577,745 | A | | 3/1986 | Calvert et al. |
| 4,589,946 | A | | 5/1986 | Borrow |
| 4,768,329 | A | | 9/1988 | Borrow |

(Continued)

OTHER PUBLICATIONS

International Search Report and Written Opinion of the International Searching Authority for corresponding International Application No. PCT/US2013/055527 mailed Nov. 21, 2013.

*Primary Examiner* — Leslie A Nicholson, III
*Assistant Examiner* — Keith R Campbell
(74) *Attorney, Agent, or Firm* — Womble Carlyle Sandridge & Rice, LLP (57) ABSTRACT

A conveyor carries products in a first lane so that first, second and third products are aligned with one another and arranged in series. Pushers move the second and third products laterally in opposite direction from the first lane to second and third lanes, respectively. The conveyor extends downstream from the pushers for carrying the first, second and third products in the first, second and third lanes, respectively. The first product may be temporarily held back in the first lane until the second product catches up to the first product, at which time the first product is released and the conveyor carries the first, second and third products in the first, second and third lanes. The third product catches up to the first and second products to least partially form a group of the products.

28 Claims, 4 Drawing Sheets

(56) References Cited

U.S. PATENT DOCUMENTS

| | | |
|---|---|---|
| 4,934,129 A | 6/1990 | Hoffman et al. |
| 5,174,430 A * | 12/1992 | Ebira .................. 198/418.5 |
| 6,648,435 B1 | 11/2003 | Jones |
| 6,907,979 B2 | 6/2005 | Ford et al. |
| 6,981,631 B2 | 1/2006 | Fogle et al. |
| 8,863,937 B2 * | 10/2014 | Buchenberg et al. ......... 198/445 |
| 2011/0132800 A1 | 6/2011 | Cerf |
| 2011/0293296 A1 | 12/2011 | Amann et al. |

* cited by examiner

SYSTEMS AND METHODS FOR SELECTING AND GROUPING PRODUCTS

CROSS-REFERENCE TO RELATED APPLICATION

This application claims the benefit of U.S. Provisional Application No. 61/743,352, filed Aug. 31, 2012.

INCORPORATION BY REFERENCE

The entire disclosure of U.S. Provisional Application No. 61/743,352, filed Aug. 31, 2012, is incorporated herein by reference.

BACKGROUND

It is known to arrange products into groups, and package the groups. Nonetheless, there is a desire for systems and methods that provide a new balance of properties with regard to the selecting and grouping of products.

BRIEF SUMMARY

One aspect of this disclosure is the provision of systems and methods for selecting and grouping products. In one example, products are conveyed along a first lane so that first, second and third products are aligned with one another and arranged in series in the first lane. More specifically, first, second and third subgroups of the products may be conveyed in the first lane in a serial arrangement. Then, the first subgroup of the products may be held stationary in the first lane, and the second subgroup of the products may be pushed out of the first lane into a second lane, so that the second subgroup of the products is conveyed along the second lane relative to the first subgroup of the products being held stationary in the first lane. When the second subgroup of the products being conveyed in the second lane becomes adjacent to (e.g., in a substantially even, laterally side-by-side arrangement with) the first subgroup of the products being held in the first lane, the first subgroup of the products in the first lane may be released and conveyed along the first lane, so that the first and second subgroups of the products together at least partially form a group of the products.

Substantially simultaneously with the second subgroup of the products being pushed out of the first lane into the second lane, the third subgroup of the products may be pushed out of the first lane into a third lane, so that the third subgroup of the products is conveyed along the third lane. The first lane may be positioned between the second and third lanes. After predetermined travel of the first, second and third subgroups of the products in the downstream direction, a pusher system may engage and push at least the third subgroup of the products from behind, so that the first, second and third subgroups of the products together at least partially form a group of the products.

Thereafter and somewhat similarly, fourth, fifth and sixth subgroups of the products may be formed into a second group of the products. The fourth subgroup of the products may be held stationary in the first lane, and the fifth and sixth subgroup of the products may be pushed out of the first lane into the third and second lanes, respectively, so that the fifth and sixth subgroups of the products are conveyed relative to the fourth subgroup of the products being held stationary in the first lane. When the fifth subgroup of the products becomes adjacent to (e.g., in a substantially even, laterally side-by-side arrangement with) the fourth subgroup of the products being held in the first lane, the fourth subgroup of the products is released and conveyed along the first lane, so that the fourth and fifth subgroups of the products together at least partially form the second group of the products. The pusher system may engage and push at least the sixth subgroup of the product from behind, so that the fourth, fifth and sixth subgroups of the products together at least partially form the second group of the products.

Thereafter, other subgroups of the products may be similarly formed into other groups of the products, in a serial fashion. The temporary holding of the respective subgroups of the products in the first lane may provide a gap between adjacent groups of the products, for allowing the pusher assembly to reach into the gap for serially pushing the groups downstream.

The foregoing presents a simplified summary of some aspects of this disclosure in order to provide a basic understanding. The foregoing summary is not an extensive summary of the disclosure and is not intended to identify key or critical elements of the invention or to delineate the scope of the invention. The purpose of the foregoing summary is to present some concepts of this disclosure in a simplified form as a prelude to the more detailed description that is presented later. For example, other aspects will become apparent from the following.

BRIEF DESCRIPTION OF THE DRAWINGS

Having described some aspects of this disclosure in general terms, reference will now be made to the accompanying drawings, which are schematic and not necessarily drawn to scale. The drawings are exemplary only, and should not be construed as limiting the invention.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention.

Figure 1:
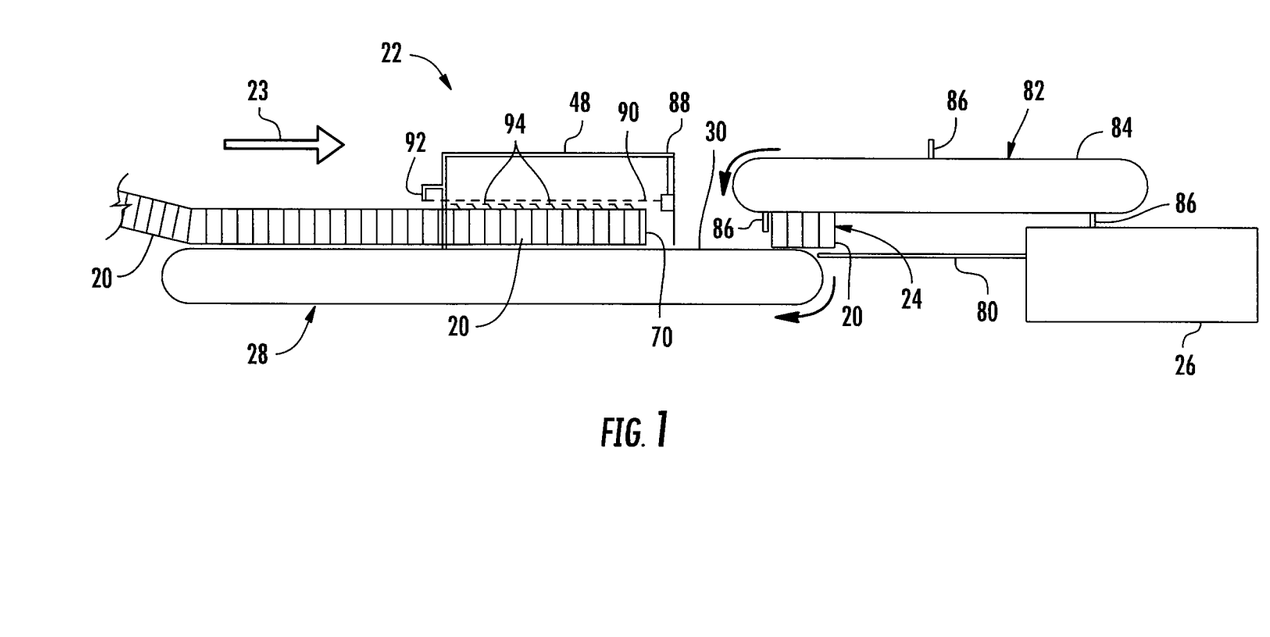
FIG. 1 is a side elevation view of a packaging machine in combination with portions of a system for selecting and grouping products, in accordance with an embodiment of this disclosure.

Referring to FIG. 1, a generally continuous stream or queue of products 20 may be arranged in single file, with or without gaps therebetween, for being supplied to an upstream end of a system 22. The system 22 may be referred to as a system for selecting and grouping the products 20. The products 20 in the system 22 travel in a machine/downstream direction that is schematically represented by an arrow 23 in FIG. 1. Portions of the system 22 are omitted in FIG. 1 in order to show the products 20 in the system.

As will be discussed in greater detail below, the system 22 forms the products 20 into groups 24, and the groups may optionally be supplied to a conventional packaging machine 26 for forming packages that include the groups. In each package, a group 24 of products 20 may be secured together in a conventional manner, such as with a paperboard carton, polymeric film overwrap, and/or any other suitable means. A group 24 of the products 20 may comprise, consist essentially of, or consist of, for example, twelve of the products arranged in a three by four arrangement, six of the products arranged in a two by three arrangement, three of the products arranged in a one by three arrangement, or any other suitable grouping of the products.

The products 20 may be conventional products such as, but not limited to, aseptic packages that may be brick-shaped and/or rectangular parallelepipedal, and may contain food (e.g., beverages). The cartons or other suitable containers of the products 20 may be constructed of paperboard, polymeric (e.g., plastic) material and/or other suitable materials so that the products 20 may have a long shelf life without refrigeration. Alternatively, the containers of the products 20 may be in the form of pouches, cans, bottles or any other suitable containers. Similarly, the products 20 may more generally be in the form of, or referred to as, articles. That is, the products 20 may be in the form of any suitable articles, or the like.

Figure 2:
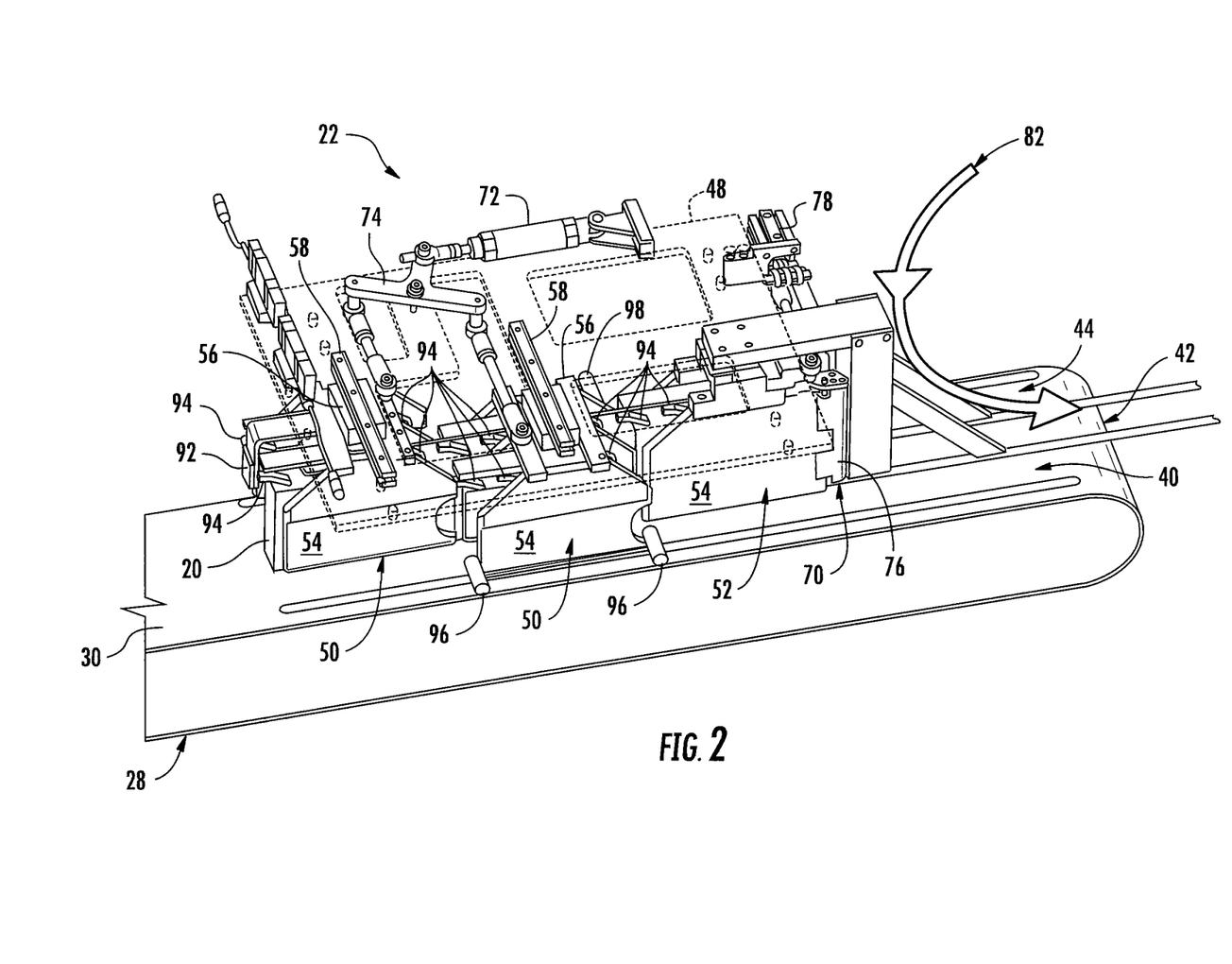
FIG. 2 is a pictorial view of a portion of the selecting and grouping system.

Referring to FIGS. 1 and 2, the system 22 may include at least one motorized conveyor 28 having an upper conveying surface 30 for moving, or more specifically carrying, the products 20 in the downstream direction schematically represented by the arrow 23 in FIG. 1. The conveyor 28 may be in the form of, or part of, a conventional motorized conveyor system having an endless belt, or the like, that is driven by a motor. The conveying surface 30 may be the upper surface of the upper run of the endless belt of the conveyor 28, and the endless belt may be a conventional raised rib conveyor belt. Alternatively, any suitable number of any suitable conveyor system(s), conveyor belt(s), conveying surface(s), or the like, may be used, as will be discussed in greater detail below.

Figure 3:
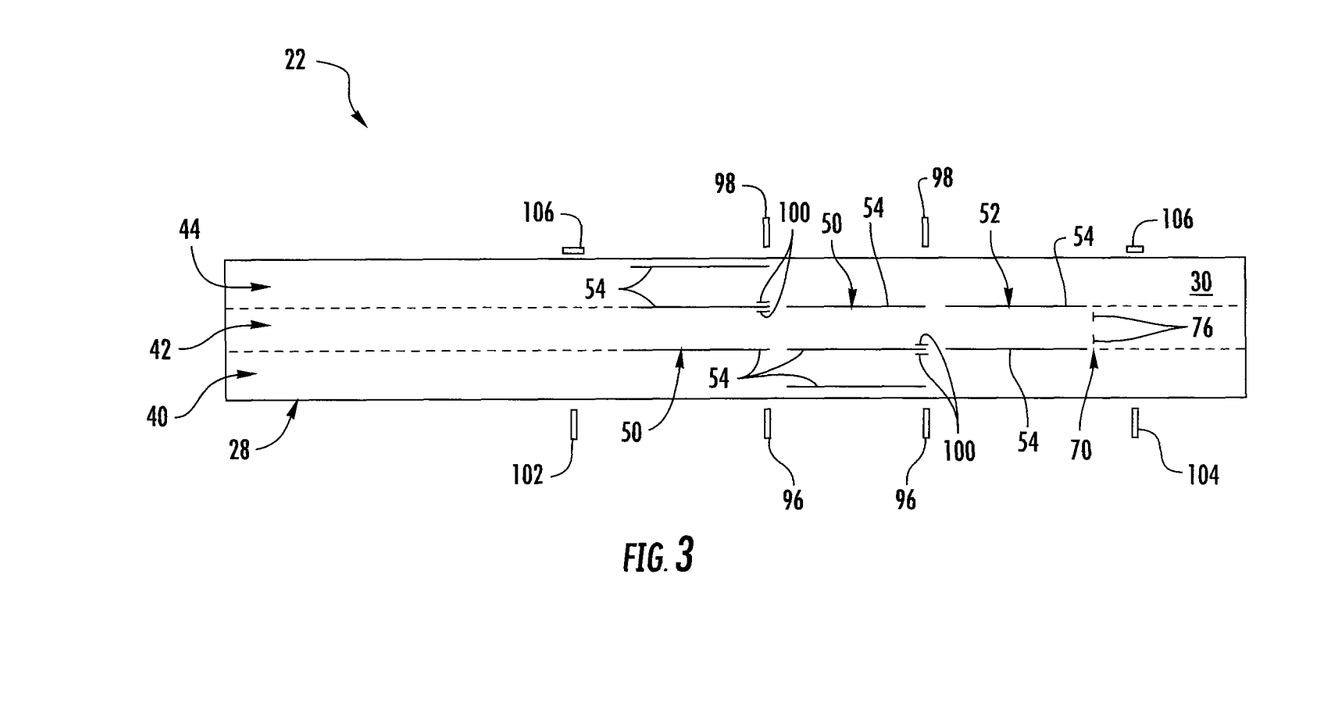
FIG. 3 is a top plan view of a portion of the selecting and grouping system.

Referring to FIGS. 2 and 3, the system 22 includes a laterally extending series of longitudinally extending side-by-side lanes 40, 42, 44. Portions of the lanes 40, 42, 44 (e.g., dividing lines between the lanes) are schematically represented by dashed lines in FIG. 3. Each of the lanes 40, 42, 44 may be at least partially defined by longitudinally extending features such as, but not limited to, the guides discussed below.

Each of the lanes 40, 42, 44 extends in the longitudinal machine direction schematically illustrated by the arrow 23 in FIG. 1. In this Detailed Description section of this disclosure, right and left directions or positions may be established with reference to an observer looking downstream, from the upstream end of the conveying surface 30 to the downstream end of the conveying surface, in the direction of the arrow 23. Accordingly, the lanes 40, 42, 44 may be respectively referred to as right, central and left lanes, although different names, numbers and arrangements of lanes are within the scope of this disclosure. Whereas a directional frame of reference has been selected for use in this Detailed Description section of this disclosure for ease of understanding, this disclosure is not limited to the frame of reference and naming conventions used herein, and any other suitable frames of reference or naming conventions may be used.

For the embodiment shown in FIGS. 1-13, the system 22 includes only a single conveyor 28 with its single conveying surface 30. Whereas including the single conveyor 28 with its single conveying surface 30 may be preferred, the system 22 may optionally include more than one conveyor and conveying surface. For example the system 22 may include an upstream conveyor that may be characterized as forming an upstream portion of the central lane 42. As another example, each of the lanes 40, 42, 44 may be equipped with its own conveyor. In one embodiment in which each of the lanes 40, 42, 44 is equipped with its own conveyor, it is preferable (e.g., optional) for each of the "lane conveyors" to be operated at the same constant speed.

Referring to FIG. 2, the system 22 includes an overhead frame 48 positioned above the conveying surface 30, and the overhead frame may be supported by a frame of the conveyor 28 and/or in any other suitable manner. The frame 48 supports upstream and downstream shuttles 50 (e.g., selectors), and a holding unit 52. Only portions of the shuttles 50 are shown in FIG. 3, and the frame 48 and other selected features are omitted from FIG. 3. The shuttles 50 or portions thereof may be referred to as selectors, since they generally function to select products 20 to be moved from the central lane 42 to the other lanes 40, 44.

Referring to FIGS. 2 and 3, each of the holding unit 52 and shuttles 50 may include one or more guides 54 that extend in the longitudinal machine direction (e.g., see arrow 23 in FIG. 1), and are positioned above and extend along the conveying surface 30, so that the guides at least partially define sections of the lanes 40, 42, 44. Each of the guides 54 may be in the form of a partition, plate, bar, rail, pusher, or any other suitable structure. The lower edges of the guides 54 are typically positioned slightly above the conveying surface 30 so that the conveying surface travels relative to the guides. Also, additional guides, partitions, plates, bars, rails or any other suitable structures may be used to further define the lanes 40, 42, 44. The guides 54 and other selected features of the system 22 are omitted from FIG. 1 in order to clarify the view. As will be discussed in greater detail below for the embodiment shown in the drawings, in each shuttle 50 at least one of the guides 54 (e.g., the central guide) functions as a pusher for laterally pushing the products 20 in the guide. Accordingly, in each shuttle 50, at least one of the guides 54 (e.g., the central guide) may be referred to as a pusher.

Referring to FIG. 2, each of the shuttles 50 is carried by the frame 48 for back and forth movement above and across the conveying surface 30 in a transverse direction. The transverse direction extends crosswise to (e.g., perpendicular to) the longitudinal machine direction (e.g., see arrow 23 in FIG. 1) in which the conveying surface 30 travels. As shown in FIG. 2, each of the shuttles 50 may include a carriage 56, and the frame 48 may include transverse rails 58 that respectively carry the carriages for back and forth movement in the transverse direction. The rails 58 may movably suspend the shuttles' carriages 56 via wheels, bearings, or the like, in a manner that will be understood by those of ordinary skill in the art.

For each of the shuttles 50, a series of the guides 54 is fixedly connected to and suspended from the carriage 56, for traveling with the carriage. For each of the shuttles 50, the guides 54 of the shuttle may be referred to as right, central and left guides, and these guides are laterally spaced apart from one another so that the shuttle defines right and left compartments (e.g., see FIG. 3) respectively between the guides of the shuttle. Somewhat similarly, the holding unit 52 includes a pair of the guides 54 that are fixedly connected to and suspended from the frame 48 for allowing the conveying surface 30 to travel thereunder. The guides 54 of the holding unit 52 are laterally spaced apart from one another so that the holding unit defines a compartment (e.g., see FIG. 3) between the guides of the holding unit. Alternatively, one or more of the guides 54 may be omitted or configured differently. For example, for each of the shuttles 50, the right and left guides 54 may be omitted, although it may be preferred (e.g., is optional) to include the right and left guides 54 for helping to stabilize the associated products 20, such as during rapid movement of the shuttles in the transverse direction, as will be discussed in greater detail below. In this regard, for each of the shuttles 50 of the embodiment illustrated in the drawings, the central guide 54 functions at least as a pusher for laterally pushing the products 20 in the shuttle, whereas the right and left guides 54 function at least as stabilizers for stabilizing the products 20 in the shuttle.

The compartments of the shuttles 50 and holding unit 52 are respectively superposed with, and at least partially define, the lanes 40, 42, 44. For example, the compartment of the holding unit 52 is superposed with and at least partially defines a section of the central lane 42. Each of the compartments of the shuttles 50 and holding unit 52 includes opposite upstream and downstream ends for allowing the conveyed products 20 to pass therethrough. These ends typically remain open, except that the holding unit 52 includes at least one movable gate or other suitable obstructor 70 for selectively obstructing (e.g., closing) and unobstructing (e.g., opening) the downstream end of the holding unit, as will be discussed in greater detail below.

Referring to FIG. 2, the shuttles 50 may be substantially simultaneously driven transversely by a control system comprising a drive assembly including at least one actuator 72 and linkage assemblies. The actuator 72 may be a pneumatic or hydraulic linear actuator, or any other suitable actuator that may be associated with at least one controller, wherein the controller is for causing the actuator to move the shuttles 50 in response to one or more signals, as will be discuss in greater detail below.

The actuator 72 may include an output shaft that reciprocates back and forth in the longitudinal machine direction (e.g., see arrow 23 in FIG. 1). The linkage(s) for driving the shuttles 50 may be configured so that, in response to the reciprocation of the output shaft of the actuator 72, the shuttles substantially simultaneously reciprocate laterally in opposite directions from one another. For example, the linkage for driving the shuttles 50 is shown in FIG. 2 as including a T-shaped bracket 74 that is centrally pivotably mounted to the frame 48, so that the three arms of the bracket extend outwardly from the central pivot point of the bracket.

The output shaft of the actuator 72 and the carriages 56 are respectively pivotably connected to the arms of the bracket 74, so that the shuttles 50 substantially simultaneously move laterally in opposite directions from one another in response to reciprocation of output shaft of the actuator 72. More specifically, the linkage, namely the output shaft of the actuator 72, the carriages 56 and the bracket 74, defines a mechanical interlock configured so that the shuttles 50 substantially simultaneously move laterally in opposite directions from one another in response to reciprocation of output shaft of the actuator 72. Alternatively, any other suitable shuttles, carriages, actuator(s) and/or linkage(s) may be used. For example, the actuator 72 may be replaced with two actuators for respectively moving the shuttles 50, wherein the two actuators may be controlled by one or more controllers, and the interlock (for causing the shuttles 50 to substantially simultaneously move laterally in opposite directions from one another) may be provided by way of processing circuitry of the controller(s). Controllers are discussed in greater detail below.

Figures 6, 7:
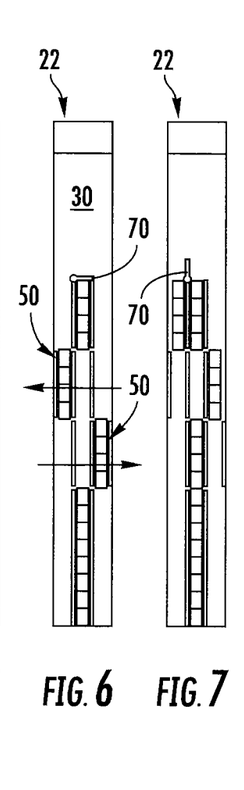
Figures 11, 12:
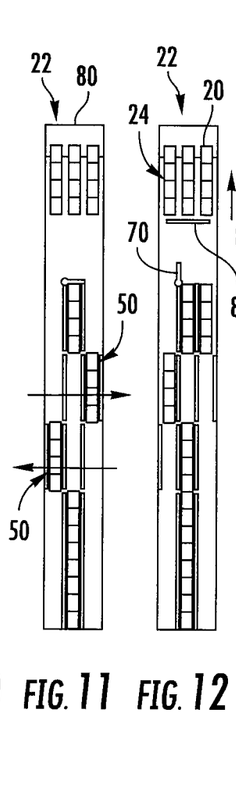

More specifically and referring to FIGS. 3, 6 and 11, each of the shuttles 50 reciprocates laterally between a right position and a left position, as schematically illustrated by arrows in FIGS. 6 and 11. For each shuttle 50, while it is in its right position, the right compartment of the shuttle is superposed with and at least partially defines a section of the right lane 40, and the left compartment of the shuttle is superposed with and at least partially defines a section of the central lane 42. Conversely, for each shuttle 50, while it is in its left position, the right compartment of the shuttle is superposed with and at least partially defines a section of the central lane 42, and the left compartment of the shuttle is superposed with and at least partially defines a section of the left lane 44. Reciprocation of the shuttles 50 is discussed in greater detail below.

As mentioned previously, the holding unit 52 includes at least one movable obstructor 70 for selectively obstructing (e.g., closing) and unobstructing (e.g., opening) the downstream end of the compartment of the holding unit. Referring to FIG. 3, the movable obstructor 70 may be in the form of a door, or may include a pair of doors 76 that may be mounted to upright hinges for respectively pivoting about vertical axes. The hinges may be respectively mounted to the downstream ends of the guides of the holding unit 52, or in any other suitable manner.

The movable obstructor 70 or doors 76 may be driven between unobstructing (e.g., open) and obstructing (e.g., closed) positions by a control system comprising a drive assembly including at least one actuator 78 (FIG. 2) and one or more linkage assemblies. The actuator 78 may be a pneumatic or hydraulic linear actuator, or any other suitable actuator that may be associated with at least one controller, wherein the controller is for causing the actuator to move the obstructor 70 in response to one or more signals, as will be discuss in greater detail below.

The actuator 78 may include an output shaft that reciprocates back and forth in the transverse direction. The linkage assembly for the doors 76 may be configured to function as a mechanical interlock so that, in response to the reciprocation of the actuator 78, the doors substantially simultaneously/cooperatively open and close the downstream end of the compartment of the holding unit 52. Alternatively, any other suitable obstructor(s), door(s), actuator(s) and/or linkage(s) may be used. For example, the actuator 78 may be replaced with two actuators for respectively moving the doors 76, wherein the two actuators may be controlled by one or more controllers, and the interlock (for causing the doors to substantially simultaneously open and close) may be provided by way of processing circuitry of the controller(s). Controllers are discussed in greater detail below.

As shown in FIG. 3, when viewed from above in their closed configurations, the doors 76 extend (substantially extend) in a common plane that extends in the transverse direction. When viewed from above in their open configurations, the doors 76 extend (substantially extend) in the downstream direction and parallel to one another. When viewed from above, the right door 76 pivots clockwise between its closed and open configurations, and counterclockwise between its open and closed configurations. Conversely, when the left door 76 is viewed from above, it pivots counterclockwise between its closed and open configurations, and clockwise between its open and closed configurations. One or more suitable sensors, such as proximity sensors, or the like, may be used to determine whether the movable obstructor 70 is (doors 76 are) open or closed respectively for unobstructing and obstructing the central lane 42. Alternatively, any other suitable holding unit, movable obstructor, door(s), actuator(s), and/or sensor(s) may be used, such as for obstructing unobstructing the central lane 42. Opening and closing of the movable obstructor 70 and doors 76 are discussed in greater detail below, for example, with reference to FIGS. 7, 8, 12 and 13.

Referring to FIG. 1, the conveyor 28 may sequentially deliver the groups 24 of products 20 to the packaging machine 26 by way of a dead plate 80 and pusher system 82. The dead plate 80 may be a conventional comb or finger plate that is associated with the downstream end of (e.g., the raised rib conveyor belt that defines) the conveying surface 30. In this regard, the dead plate 80 may be cooperatively configured with the downstream and of the conveyor 28 for aiding in the transfer of the products 20 off of the conveying surface 30. Movement of features of the upstream end of the pusher system 82 are schematically represented by an arcuate arrow in FIG. 2. The dead plate 80 and pusher system 82 may be cooperative with the selecting and grouping system 22 for completing the grouping of the products 20. Accordingly, the dead plate 80, pusher system 82 and/or other features may be optionally be characterized as being part of the selecting and grouping system 22.

The pusher system 82 may be in the form of a motorized overhead (lug) conveyor having an endless belt 84, chain or the like, having projections 86 (e.g., lugs) mounted thereto for engaging and pushing against the upstream (e.g., rear) surfaces of the upstream products 20 of a group 24. The projections 86 of the pusher system 82 may be lugs, plates, bars, paddles, flights or other suitable pushing mechanisms that may extend both in the transverse direction and downwardly from the lower run of the overhead conveyor belt 84. The lower flight of the overhead conveyor belt 84 may be positioned above and extend parallel to the downstream end of the conveying surface 30 of the lower conveyor 28. The projections 86 of the pusher system 82 may be spaced apart so that they are inserted between the groups 24 of products 20 and push the groups across the dead plate 80 to the packaging machine 26, or to another suitable destination. Any suitable number of, and spacing between, the projections 86 may be used, and the speeds of the selecting and grouping system 22 and pusher system 82 may be coordinated so that the projections 86 may be inserted between the groups 24 of products 20 and push the groups across the dead plate 80 in a serial fashion, as will be discussed in greater detail below.

Operation of features of this disclosure, such as the actuators 72, 78 and motor(s) of the conveyors 28, 84, may be coordinated by a control system including one or more controllers and one or more sensors. The controller(s) may be one or more programmable logic controllers (PLCs), computers, computer processors, or the like, that may be responsive to the sensor(s) for selecting and grouping the products, such as in the manner discussed below with reference to FIGS. 4-13. Any suitable controller(s) and sensor(s) may be used, and examples of suitable controllers and sensors are discussed in the following. For example, the controller(s) may include processing circuitry for automatically facilitating methods of this disclosure, examples of which are discussed in the following.

Referring to FIG. 1, a central sensor assembly may include a central photosensor 88 for providing an electrical output signal, such as in response to an unbroken beam of light extending between opposite ends of an optical path 90 associated with the central photosensor. As will be discussed in greater detail below, the central sensor assembly (e.g., central photosensor 88) is for ensuring that a full set of upright products 20 has properly arrived in the central lane 42 for facilitating predetermined selecting and grouping.

The optical path 90 associated with the central photosensor 88 is schematically illustrated by a dashed line in FIG. 1. The optical path 90 may be positioned above and parallel to the central lane 42. For example, the central photosensor 88 may be an optical transceiver 88 mounted to a downstream portion of the frame 48 for both transmitting the beam of light to a central mirror 92 mounted to an upstream portion of the frame, and receiving the reflected beam from the central mirror if the optical path 90 is not obstructed. Alternatively, the optical transceiver 88 may be replaced with an optical transmitter and the central mirror 92 may be replaced with an optical receiver, or vice versa. More generally, the sensors of this disclosure may be modified, replaced, repositioned or otherwise configured in any suitable manner.

Referring to FIGS. 1 and 2, the central sensor assembly includes one or more movable indicator members 94 for selectively obstructing and unobstructing the optical path 90. More specifically, each of the compartments of the shuttles 50 and holding unit 52 may include a series of indicator members 94, wherein each of the indicator members may be characterized as functioning like a flag, or the like, for signaling the presence or absence of a suitably oriented product 20 beneath it. Reiterating from above, each of the shuttles 50 may include a pair of compartments respectively defined by the guides 54 of the shuttle, and the holding unit 52 may include a compartment defined between the guides of the holding unit. In the embodiment shown in the drawings, in which each product group 24 includes twelve of the products 20 arranged in a three by four arrangement, each of the compartments includes four of the indicator members 94 arranged in a series that extends in the longitudinal machine direction and is positioned in the upper region of the compartment.

For each compartment of the shuttles 50 and holding unit 52, each indicator member 94 may be mounted for pivoting relative to the compartment, so that the indicator member, or a portion thereof, is pivotable or otherwise movable between a raised state and a lowered state. More specifically, each indicator member 94 may be pivotably carried by a transversely extending axle or pivot having opposite ends respectively mounted to the opposite guides 54 of the compartment. Each indicator member 94 may have a pair of arms that extend at an oblique angle with respect to one another, with a longer of the arms being heavier than a shorter of the arms, for biasing (e.g., via gravity) the short arm to the raised state. In the raised state, the longer arm extends downwardly and the shorter arm extends upwardly. In the lowered state, a product 20 is positioned beneath the indicator member 94 in a predetermined manner so that the longer arm engages the product and the longer arm is inclined, so that the shorter arm no longer extends upright or extends upright to a lesser extent than in the raised state. For example, FIG. 1 schematically illustrates all of the indicator members 94 vertically aligned with the central lane 42 being in a lowered state so that the optical path 90 associated with the central photosensor 88 is unobstructed, such as for indicating that first, second and third subgroups of the products 20 (e.g., twelve or the products) are contained within a predetermined section of the central lane 42 (also see FIGS. 5 and 8-10). In contrast, if any one of the indicator members 94 vertically aligned with the central lane 42 is in its raised state, the optical path 90 would be obstructed (e.g., see FIGS. 4, 6, 7 and 11-13).

Alternatively, the indicator members 94 may be configured and/or biased in any other suitable manner. For example, each of the indicator members 94 may alternatively be in the form of an eccentrically mounted roller, an oblong roller, or any other suitable structure for selectively obstructing and unobstructing the optical path 90 associated with the central photosensor 88.

Referring to FIG. 3, each of the shuttles 50 may be configured for interacting with right and left photosensors 96, 98, so that there may be upstream right and left photosensors 96, 98, and downstream right and left photosensors 96, 98. Each of the right and left photosensors 96, 98 may be an optical transceiver fixedly mounted to a frame of the system 22. For each shuttle 50, each of the right and left guides 54 has a recess, hole, or the like, in its downstream end for allowing an optical path to extend therethrough from the adjacent photosensor 96, 98. For each shuttle 50, the central guide 54 has mirrors 100 respectively mounted to its opposite faces proximate the upstream end of the middle guide, so that transversely extending optical paths may be respectively defined between the mirrors 100 and the right and left photosensors 96, 98. The optical paths associated with right and left photosensors 96, 98 extend above the conveying surface 30 for being selectively obstructed by the products 20, as will be discussed in greater detail below.

Optionally and as schematically shown in FIG. 3, each of upstream and downstream photosensors 102, 104 may be an optical transceiver fixedly mounted to the frame of the system 22, and mirrors 106 may be fixedly mounted to opposite sides of the frame so that transversely extending optical paths may be respectively defined between the upstream and downstream photosensors 102, 104 and mirrors 106. The optical paths associated with upstream and downstream photosensors 102, 104 extend above the conveying surface 30 for being selectively obstructed by the products 20. The upstream photosensor 102 may be for ensuring that there are sufficient products 20 in the queue for the next grouping of the products, and the upstream photosensor 102 may be referred to as a minimum queue sensor. The downstream photosensor 104 may be for ensuring that there is a sufficient gap between adjacent groups 24 of products 20 for receiving the projections 86 (e.g., lugs) of the overhead (lug) conveyor 84, as will be discussed in greater detail below.

FIGS. 4-13 are top plan views of a selected portion of the system 22, and they, in conjunction with FIGS. 1-3, illustrate aspects of a sequence for selecting and grouping products 20, in accordance with an embodiment of this disclosure.

In FIG. 6, the arrows extending crosswise are schematically illustrative of the shuttles 50 being substantially simultaneously moved laterally in opposite directions relative to one another so that, considered together, the shuttles are reconfigured from a first configuration to a second configuration. In FIG. 11, the arrows extending crosswise are schematically illustrative of the shuttles 50 being substantially simultaneously moved laterally in opposite directions relative to one another so that, considered together, the shuttles are reconfigured from the second configuration to the first configuration.

FIGS. 2-5 and 11-13 show the shuttles 50 in the first configuration. When the shuttles 50 are in the first configuration, the right compartment of the upstream shuttle 50, the left compartment of the downstream shuttle 50 and the compartment of the holding unit 52 are aligned with the central lane 42. Also when the shuttles 50 are in the first configuration, the left compartment of the upstream shuttle 50 is aligned with the left lane 44, and the right compartment of the downstream shuttle 50 is aligned with the right lane 40.

FIGS. 6-10 show the shuttles 50 in the second configuration. When the shuttles 50 are in the second configuration, the left compartment of the upstream shuttle 50, the right compartment of the downstream shuttle 50 and the compartment of the holding unit 52 are aligned with the central lane 42. Also when the shuttles 50 are in the second configuration, the left compartment of the downstream shuttle 50 is aligned with the left lane 44, and the right compartment of the upstream shuttle 50 is aligned with the right lane 40. One or more suitable sensors, such as proximity sensors, or the like, may be used to determine whether the shuttles 50 are in the first or second configuration.

Figure 4:
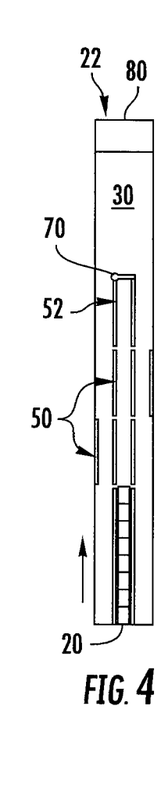
FIGS. 4-13 are top plan views of a selected portion of the system, and they illustrate a sequence for selecting and grouping products, in accordance with an embodiment of this disclosure.

In FIG. 4, a queue of the products 20 extends into an upstream portion of the central lane 42 and is being carried downstream by the conveying surface 30, the movable obstructor 70 is (e.g., the doors 76 shown in FIG. 3 are) closed, and each of the indicator members 94 (FIGS. 1 and 2) is in its raised state. It is within the scope of this disclosure for the queue of the products 20 in the central lane 42 to be described in different ways. For example, the queue may be described as comprising first and second products 20 or subgroups of products that are substantially aligned with one another and arranged in series in the central lane 42, so that the second product or subgroup of products is behind the first product or subgroup of products in the longitudinal machine direction. The queue may also be described as comprising first, second and third products 20 or subgroups of products that are substantially aligned with one another and arranged in series in the central lane 42, so that the second product(s) are behind the first product(s) and the third product(s) are behind the second product(s) in the longitudinal machine direction.

Figure 5:
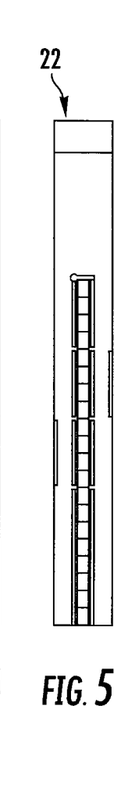

FIG. 5 is like FIG. 4, except, for example, that the conveying surface 30 has carried products 20 into each of the right compartment of the upstream shuttle 50, the left compartment of the downstream shuttle 50, and the compartment of the holding unit 52. In FIG. 5, the closed movable obstructor 70 may have arrested forward movement of products 20 that are positioned upstream from the movable obstructor in the central lane 42, so that the conveying surface 30 is moving downstream relative to the products positioned upstream from the movable obstructor in the central lane.

In the configuration shown in FIG. 5, the indicator members 94 of each of the left compartment of the upstream shuttle 50 and the right compartment of the downstream shuttle 50 are in their raised state. In contrast and further regarding the configuration of FIG. 5, the indicator members of each of the right compartment of upstream shuttle 50, the left compartment of the downstream shuttle 50 and the holding unit 52 are in their lowered state. As a result, the optical path 90 associated with the central photosensor 88 is not obstructed by any of the indicator members 94. In this regard, FIG. 1 schematically illustrates all of the indicator members 94 of the right compartment of upstream shuttle 50, the left compartment of the downstream shuttle 50 and the holding unit 52 being in their lowered state so that the optical path 90 associated with the central photosensor 88 is unobstructed.

FIG. 6 is like FIG. 5, except, for example, that the shuttles 50 are in the second configuration. The shuttles 50 may be reconfigured from the first configuration to the second configuration by operation of the actuator 72 (FIG. 2). Operation of the actuator 72 may be responsive to an electrical signal from the central photosensor 88 (FIG. 1). The central photosensor 88 may provide the electrical signal in response to the state schematically shown in FIGS. 1, 2 and 5, in which the optical path 90 (FIG. 1) associated with the central photosensor 88 is not obstructed by any of the indicator members 94 (FIGS. 1 and 2) of the right compartment of upstream shuttle 50, the left compartment of the downstream shuttle 50 or the holding unit 52.

For transferring the shuttles 50 between the first configuration and the second configuration, operation of the actuator 72 (FIG. 2) may also be associated with signals from the upstream left photosensor 98 (FIG. 3) and the downstream right photosensor 96 (FIG. 3), wherein these signals may be provided in response to the optical paths associated with the upstream left photosensor 98 and the downstream right photosensor 96 being unobstructed, for confirming that any subgroups of products 20 have exited both the downstream end of the left compartment of the upstream shuttle 50 and the downstream end of the right compartment of the downstream shuttle 50. That is, the actuator 72 may operate for transferring the shuttles 50 between the first and second configurations in response to simultaneous electrical signals from the central photosensor 88, upstream left photosensor 98 and downstream right photosensor 96.

In the embodiment illustrated in the drawings, there are three lanes 40, 42, 44 and each subgroup of products 20 consists of four products, such that each group 24 of products 20 consists of twelve products. Notwithstanding, other numbers of lanes and/or products are within the scope of this disclosure. For example, each subgroup of products 20 may consist of more or less than four products. As a more specific example, each subgroup may be in the form of a single product 20, so that, when there are three lanes 40, 42, 44, each group 24 of products 20 may consists of three products.

In FIG. 6, the movable obstructor 70 is arresting/restricting any forward movement of a first subgroup of products 20 in the compartment of the holding unit 52, whereas the other products are being carried downstream by the conveying surface 30. That is, the first subgroup of products 20 that is positioned in the compartment of the holding unit 52 is held back so that the conveying surface 30 is moving downstream relative to the first subgroup of products that is positioned in the compartment of the holding unit 52.

In FIG. 6, while the first subgroup of products 20 is being held stationary by the holding unit 52 or movable obstructor 70 in the central lane 42, second and third subgroups of products have been pushed by the respective central guides 54 (e.g., pushers) out of the central lane into the left and right lanes 44, 40, respectively. As a result, the second and third subgroups of products 20 are conveyed (by the conveying surface 30) downstream relative to the first subgroup of products being held stationary in the central lane 42.

FIG. 7 is like FIG. 6, except, for example, the products 20 other than the first subgroup of products in the compartment of the holding unit 52 have been carried farther downstream by the conveying surface 30, and the movable obstructor 70 has been opened and is in its unobstructing position so that the first subgroup of products in the holding unit 52 is released for being carried downstream by the conveying surface 30. The movable obstructor 70 (e.g., doors 76) may be opened by operation of the actuator 78 (FIG. 2). With the shuttles 50 in the second configuration, operation of the actuator 78 may be responsive to simultaneous electrical signals from all of the upstream right photosensor 96 (FIG. 3), downstream left photosensor 98 (FIG. 3) and downstream photosensor 104 (FIG. 3). These signals from the upstream right photosensor 96 and the downstream left photosensor 96 may be provided in response to the optical paths associated with the upstream right photosensor 96 and the downstream left photosensor 96 being unobstructed, for confirming that the second and third subgroups of products 20 have exited both the downstream end of the left compartment of the downstream shuttle 50 and the downstream end of the right compartment of the upstream shuttle 50. The signal from the downstream photosensor 104 may be provided in response to the optical path associated with the downstream photosensor 104 being unobstructed, for confirming that a sufficient gap exists between adjacent groups 24 of products 20, as will be discussed in greater detail below.

Figure 8:
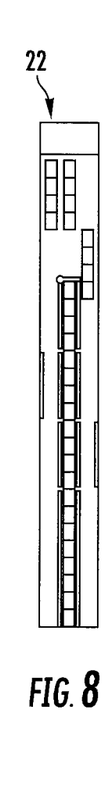

In FIG. 7, the second subgroup of products 20 being conveyed in the left lane 44 catches up to and becomes adjacent to (e.g., in a substantially even, side-by-side arrangement with) the first subgroup of products being held in the central lane 42, and the first subgroup of products in the central lane 42 is released by the holding unit 52 and conveyed along the central lane 42, so that the first and second subgroups of products together at least partially form a first group 24 of the products. While the second subgroup of products 20 is catching up to the first subgroup of products, the second subgroup of products becomes less far behind the first subgroup of products. In FIGS. 7 and 8, the third subgroup of products 20 being conveyed in the right lane 40 trails the first and second subgroups of products.

FIG. 8 is like FIG. 7, except, for example, the products 20 have been carried further downstream by the conveying surface 30, and the movable obstructor 70 is (e.g., the doors 76 are) closed. The movable obstructor 70 may be closed by operation of the actuator 78. While the shuttles 50 are in their second configuration, the actuator 72 may operate to close the movable obstructor 70 in response to an electrical signal from the downstream right photosensor 96. This signal from the downstream right photosensor 96 may be provided in response to the optical path associated with the downstream right photosensor 96 being obstructed, for confirming that a product 20 or group of products is in a predetermined position in the central lane 42. More specifically, the signal from the downstream right photosensor 96 may be provided in response to the optical path associated with the downstream right photosensor 96 being obstructed, for confirming that a product 20 or group of products has traveled to and is present in the downstream end of the right compartment of the downstream shuttle 50. There may be a predetermined time delay between receipt of this signal from the downstream right photosensor 96 and actuation of the actuator 78 for closing the movable obstructor 70 in an effort to ensure that the first subgroup of products has fully exited the downstream end of the compartment of the holding unit 52 before the movable obstructor 70 is closed.

Figure 9:
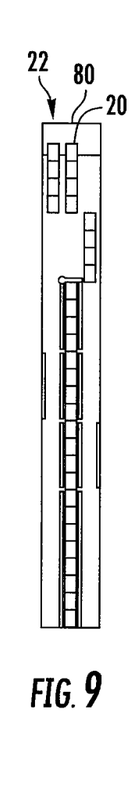
Figure 10:
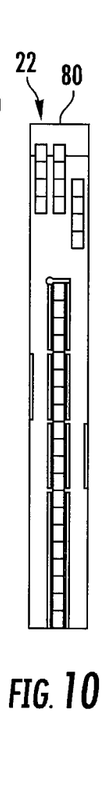

FIGS. 9 and 10 are like FIG. 8, except, for example, the products 20 have been carried farther downstream by the conveying surface 30. In FIGS. 9 and 10, the conveying surface 30 has carried products 20 into each of the left compartment of the upstream shuttle 50, the right compartment of the downstream shuttle 50, and the compartment of the holding unit 52. In FIGS. 9 and 10, the closed movable obstructor 70 may have arrested forward movement of products 20 that are positioned upstream from the movable obstructor in the central lane 42, so that the conveying surface 30 is moving downstream relative to the products upstream from the movable obstructor in the central lane.

In FIGS. 9-11, the dead plate 80 may restrict or arrest downstream movement of the first and second subgroups of products 20 so that, as shown in FIG. 11, the third subgroup of products catches up to and becomes adjacent to (e.g., in a substantially even, side-by-side arrangement with) the first and second subgroups for further forming a group 24 of products. That is, there is relative movement in the longitudinal direction between the first, second and third subgroups of products 20 so that the first, second and third subgroups of products become arranged substantially laterally side-by-side with one another to at least partially form the group 24 of the products. As a more specific example, the dead plate 80 restricts longitudinal movement of the first and second subgroups of products 20 in the central and left lanes 42, 44 while the conveyor 28 continues to move the third subgroup of products in the right lane 40, so that the third subgroup catches up to the first and second subgroups.

In the configurations shown in FIGS. 9 and 10, the indicator members 94 of each of the right compartment of the upstream shuttle 50 and the left compartment of the downstream shuttle 50 are in their raised state. In contrast, the indicator members 94 of each of the left compartment of upstream shuttle 50, the right compartment of the downstream shuttle 50 and the holding unit 52 are in their lowered state. As a result, the optical path 90 associated with the central photosensor 88 is not obstructed by any of the indicator members 94. In this regard, FIG. 1 schematically illustrates all of the indicator members 94 of the left compartment of upstream shuttle 50, the right compartment of the downstream shuttle 50 and the holding unit 52 being in their lowered state, so that the optical path 90 associated with the central photosensor 88 is unobstructed.

FIG. 11 is like FIGS. 9 and 10, except, for example, that the shuttles 50 are in the first configuration. The shuttles 50 may be reconfigured from the second configuration to the first configuration by operation of the actuator 72. Operation of the actuator 72 may be responsive to an electrical signal from the central photosensor 88. The central photosensor 88 may provide the electrical signal in response to the state schematically shown in FIGS. 9 and 10, in which the optical path 90 associated with the central photosensor 88 is not obstructed by any of the indicator members 94 of the left compartment of upstream shuttle 50, the right compartment of the downstream shuttle 50 or the holding unit 52 due to predetermined presence of products 20.

For transferring the shuttles 50 between the second and first configurations, operation of the actuator 72 may also be associated with signals from the upstream right photosensor 96 and the downstream left photosensor 98, wherein these signals may be provided in response to the optical paths associated with the upstream right photosensor 96 and the downstream left photosensor 98 being unobstructed, for confirming that any subgroups of products 20 have exited both the downstream end of the left compartment of the downstream shuttle 50 and the downstream end of the right compartment of the upstream shuttle 50. That is, the actuator 72 may operate for transferring the shuttles 50 between the second and first configurations in response to simultaneous electrical signals from the central photosensor 88, upstream right photosensor 96 and downstream left photosensor 98.

In FIG. 11, the movable obstructor 70 is arresting/restricting any forward movement of a fourth subgroup of products 20 in the compartment of the holding unit 52, whereas fifth and sixth subparagraphs of products are being carried downstream by the conveying surface 30. That is, the fourth subgroup of products 20 that is positioned in the compartment of the holding unit 52 is held back so that the conveying surface 30 is moving downstream relative to the fourth subgroup of products.

In FIG. 11, while the fourth subgroup of products 20 is being held stationary by the holding unit 52 or movable obstructor 70 in the central lane 42, the fifth and sixth subgroups of products have been pushed by the respective central guides 54 (e.g., pushers) out of the central lane into the right and left lanes 40, 44, respectively. As a result, the fifth and sixth subgroups of products 20 are conveyed (by the conveying surface 30) downstream relative to the fourth subgroup of products being held stationary in the central lane 42.

FIG. 12 is like FIG. 11, except, for example, the movable obstructor 70 has been opened and in its unobstructing position so that the fourth subgroup of products in the holding unit 52 is released for being carried downstream by the conveying surface 30. The movable obstructor 70 (e.g., doors 76) may be opened by operation of the actuator 78. With the shuttles 50 in the first configuration, operation of the actuator 78 may be responsive to simultaneous electrical signals from all of the downstream right photosensor 96, upstream left photosensor 96 and downstream photosensor 104. These signals from the downstream right photosensor 96 and the upstream left photosensor 96 may be provided in response to the optical paths associated with the downstream right photosensor 96 and the upstream left photosensor 96 being unobstructed, for confirming that the fifth and sixth subgroups of products 20 have exited both the downstream end of the right compartment of the downstream shuttle 50 and the downstream end of the left compartment of the upstream shuttle 50. The signal from the downstream photosensor 104 may be provided in response to the optical path associated with the downstream photosensor 104 being unobstructed, for confirming that a sufficient gap exists between adjacent groups 24 of products 20, for receiving a projections 86 of the overhead conveyor 84 for pushing the group located at the dead plate 80 at least partially across the dead plate.

FIGS. 7 and 12 show paired groups of products positioned proximate the holding unit 52, wherein the groups of each pair are arranged in an even, laterally side-by-side arrangement with respect to one another. The paired groups are not required to be in a perfectly even, laterally side-by-side arrangement. For example, there may be time delays, mechanical clearances, relative sliding between the products 20 and the conveying surface 30, or other features may be present in the system 22 such that paired groups of products 20 are not in a perfectly even, lateral side-by-side arrangement with one another. For example, there may be "mechanical play" in the linkage(s) by way of which the obstructor 70 or doors 76 are driven by the actuator 78, so that paired groups of products are not in a perfectly even, lateral side-by-side arrangement with one another. Accordingly, the paired groups of products may more generally be in substantially even, lateral side-by-side arrangement with one another. Similarly at least some time delay, mechanical clearances, mechanical play, relative sliding between the products 20 and the conveying surface 30, or other suitable variables may be associated with one or more other features of the system 22 such that other characteristics of the system may be qualified by the terms substantially, approximately or the like.

Figure 13:
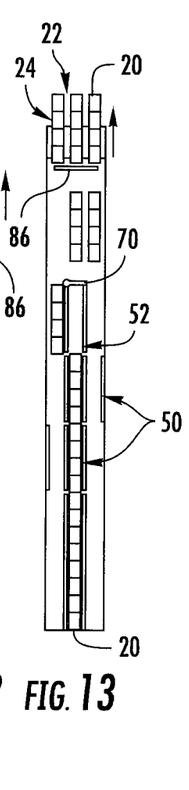

FIG. 13 is like FIG. 12, except, for example, products 20 have been carried further downstream by the conveying surface 30, and the movable obstructor 70 is (e.g., the doors 76 are) closed. The movable obstructor 70 may be closed by operation of the actuator 78. While the shuttles 50 are in their first configuration, the actuator 72 may operate to close the movable obstructor 70 in response to an electrical signal from the downstream left photosensor 98. This signal from the downstream left photosensor 98 may be provided in response to the optical path associated with the downstream left photosensor 98 being obstructed, for confirming that products 20 have traveled to and are present in the downstream end of the left compartment of the downstream shuttle 50. There may be a predetermined time delay between receipt of this signal from the downstream left photosensor 98 and actuation of the actuator 78 for closing the movable obstructor 70 in an effort to ensure that the fourth subgroup of products has fully exited the downstream end of the compartment of the holding unit 52 before the movable obstructor 70 is closed.

Thereafter, the processes (e.g., shown in FIGS. 4-13) are continued so that other subgroups of products 20 may be similarly formed into other groups 24 of the products, in a serial fashion. The temporary holding of the respective subgroups of products 20 in the holding unit 52 may provide a gap between adjacent groups 24 of the products, for allowing the projections 86 of the pusher assembly 82 to reach into the gaps for engaging and pushing against the upstream or rear surfaces of the upstream or rear products of each group, for serially pushing the groups downstream, such as at least partially across the dead plate 80.

For the embodiment illustrated in the drawings, the conveying surface 30 carries the products 20 downstream typically without there being (e.g., substantially without any) relative sliding between the conveying surface 30 and the products 20, except that relative sliding between the conveying surface 30 and the products 20 does occur when a product is directly or indirectly affected by the obstructor 70, shuttles 50, dead plate 80 or the projections 86 of the pusher system 82 in a manner that causes relative movement between (e.g., sliding contact between) the products 20 and the longitudinally moving conveying surface 30. For example, in the configurations shown in FIGS. 5, 6, 8-11 and 13 there will be longitudinal sliding contact between the products 20 being held back by the obstructor 70 and the longitudinally moving conveying surface 30. As another example, when the shuttles 50 are laterally reciprocated as schematically illustrated by arrows in FIGS. 6 and 11, there will be lateral sliding contact between the products 20 being pushed laterally by the shuttles and the longitudinally moving conveying surface 30. Alternatively, there may be variations in any sliding between the conveying surface 30 and the products 20.

Regarding the possibility of any relative sliding in the longitudinal direction between the conveying surface 30 and the products 20, such sliding may occur depending upon, for example, the speed of the conveying surface 30, the mass of the products 20, the shape of the products, coefficient(s) of friction and/or the relevant variables. More specifically, such relative sliding in the longitudinal may occur when products 20 are released by the obstructor 70 and/or when products are pushed laterally into the side lanes 40, 44.

At the instant when the second and third subgroups of products 20 are pushed laterally into the side lanes 40, 44, the velocity of the second and third subgroups in the longitudinal direction may be zero. In contrast, at this same time the conveying surface 30 will typically have a velocity in the longitudinal direction. As a result and depending upon factor(s) mentioned above in the prior paragraph, one or more of the upstream/trailing products 20 in the side lanes 40, 44 may tip over backwards if the speed of the conveying surface 30 is too fast. Relatively tall, thin products 20 may be more susceptible to tipping over. If necessary, the speed of the conveying surface 30 may be adjusted downward to stabilize the products 20. That is, the speed of the conveying surface 30 may be adjusted downward to a point at which such tipping over is eliminated or reduced to an acceptable amount. The speed of other appropriate features of the system 22 is typically adjusted in proper proportion or relation to the adjustments in the speed of the conveying surface 30.

Regarding the above-discussed controller(s) in greater detail, a controller may include processing circuitry that is configurable to perform actions in accordance with one or more embodiments disclosed herein. In this regard, the processing circuitry may be configured to perform and/or control performance of one or more functionalities of the controller in accordance with various embodiments, and thus may provide means for performing functionalities of the controller in accordance with various embodiments. The processing circuitry may be configured to perform data processing, application execution and/or other processing and management services according to one or more embodiments.

In some embodiments, the processing circuitry may include a processor and the processing circuitry may further include memory. The processing circuitry may be in communication with or otherwise control a communication interface and/or transmit queue manager. The processor may be embodied in a variety of forms. For example, the processor may be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. The processor may comprise a plurality of processors. The plurality of processors may be in operative communication with each other and may be collectively configured to perform one or more functionalities of the controller. In some embodiments, the processor may be configured to execute instructions that may be stored in the memory or that may be otherwise accessible to the processor. For example, in some embodiments, the processor may be embodied as a general purpose computing processor that may be coupled to the memory, such as via a bus, and may be configured to perform operations in accordance with one or more embodiments through execution of instructions that may be stored in the memory. As such, whether configured by hardware or by a combination of hardware and software, the processor is capable of performing operations according to various embodiments while configured accordingly.

In some embodiments, the memory may include one or more memory devices. Memory may include fixed and/or removable memory devices. In some embodiments, the memory may provide a non-transitory computer-readable storage medium that may store computer program instructions that may be executed by the processor. In this regard, the memory may be configured to store information, data, applications, instructions and/or the like for enabling the controller to carry out various functions in accordance with one or more embodiments. In some embodiments, the memory may be in communication with one or more of the processor, communication interface, or transmit queue manager via a bus (or buses) for passing information among components of the controller.

The above examples are in no way intended to limit the scope of the present invention. It will be understood by those skilled in the art that while the present disclosure has been discussed above with reference to exemplary embodiments, various additions, modifications and changes can be made thereto without departing from the spirit and scope of the appended claims and their equivalents.

What is claimed is:

1. A system for at least partially grouping a plurality products, the system comprising:

at least one conveyor for conveying the plurality of products in a longitudinal direction in a longitudinally extending first lane so that first, second and third products of the plurality of products are substantially aligned with one another and arranged in series in the first lane, so that the second product is behind the first product in the longitudinal direction, and the third product is behind the second product in the longitudinal direction;

an upstream pusher mounted for being moved laterally relative to the at least one conveyor for moving the second product laterally from the first lane to a second lane; and a downstream pusher mounted for being moved laterally relative to the at least one conveyor for moving the third product laterally from the first lane to a third lane, wherein the first lane is positioned between the second and third lanes, and the system is configured to cause the upstream and downstream pushers to substantially simultaneously move in opposite directions from one another.

2. The system according to claim 1, wherein the at least one conveyor extends downstream from the downstream pusher for:

conveying the first product in the longitudinal direction in the first lane, conveying the second product in the longitudinal direction in the second lane, and conveying the third product in the longitudinal direction in the third lane.

3. The system according to claim 1, further comprising at least one obstructor positioned downstream from the pusher, the at least one obstructor being mounted for being moved into and out of the first lane for selectively restricting movement of the first product in the first lane, for at least reducing how far the second and third products are behind the first product in the longitudinal direction.

4. The system according to claim 3, further comprising:

at least one actuator operatively connected to the at least one obstructor for moving the at least one obstructor into and out of the first lane for selectively restricting movement of the first product in the longitudinal direction in the first lane; and at least one controller operatively associated with the at least one actuator for causing the at least one actuator to move the at least one obstructor into and out of the first lane in response to one or more signals, so that the first and second products become arranged substantially laterally side-by-side with one another to at least partially form a group of the products.

5. The system according to claim 4, wherein:

the at least one actuator is at least a first actuator;

the system further comprises at least a second actuator operatively connected to the upstream pusher for moving the upstream pusher laterally relative to the at least one conveyor for moving the second product laterally from the first lane to the second lane; and the at least one controller is operatively associated with at least the second actuator for causing at least the second actuator to move the upstream pusher laterally relative to the at least one conveyor for moving the second product laterally from the first lane to the second lane in response to one or more signals.

6. A system for at least partially grouping a plurality products, the system comprising:

at least one conveyor for conveying the plurality of products in a longitudinal direction in a longitudinally extending first lane so that first and second products of the plurality of products are substantially aligned with one another and arranged in series in the first lane, so that the second product is behind the first product in the longitudinal direction;

a pusher mounted for being moved laterally relative to the at least one conveyor for moving the second product laterally from the first lane to a second lane;

the at least one conveyor extending downstream from the pusher for conveying the first product in the longitudinal direction in the first lane, and conveying the second product in the longitudinal direction in the second lane;

at least one obstructor positioned downstream from the pusher, the at least one obstructor being mounted for being moved into and out of the first lane for selectively restricting movement of the first product in the first lane, for at least reducing how far the second product is behind the first product in the longitudinal direction;

a longitudinally extending third lane, the first lane being positioned between the second and third lanes;

a downstream shuttle that includes the pusher positioned between a pair of longitudinally extending and laterally spaced apart guides of the downstream shuttle, the downstream shuttle being mounted for reciprocating laterally across the first, second and third lanes;

a holding station positioned downstream from the downstream shuttle and including the at least one obstructor positioned proximate an end of a pair of longitudinally extending and laterally spaced apart guides of the holding station;

an upstream shuttle that includes a pusher positioned between a pair of longitudinally extending and laterally spaced apart guides of the upstream shuttle, the upstream shuttle being mounted for reciprocating laterally across the first, second and third lanes; and an interlock for causing the downstream and upstream shuttles to substantially simultaneously move in opposite directions from one another.

7. A system for at least partially grouping a plurality products, the system comprising:

at least one conveyor for conveying the plurality of products in a longitudinal direction in a longitudinally extending first lane so that first and second products of the plurality of products are substantially aligned with one another and arranged in series in the first lane, so that the second product is behind the first product in the longitudinal direction;

a pusher mounted for being moved laterally relative to the at least one conveyor for moving the second product laterally from the first lane to a second lane;

the at least one conveyor extending downstream from the pusher for conveying the first product in the longitudinal direction in the first lane, and conveying the second product in the longitudinal direction in the second lane;

at least one obstructor positioned downstream from the pusher, the at least one obstructor being mounted for being moved into and out of the first lane for selectively restricting movement of the first product in the first lane, for at least reducing how far the second product is behind the first product in the longitudinal direction; wherein the at least one conveyor comprises a conveying surface, the conveying surface being configured for each of conveying the plurality of products in the longitudinal direction in the first lane so that the first, the second and a third product of the plurality of products are substantially aligned with one another and arranged in series in the first lane, so that the second product is behind the first product and the third product is behind the second product in the longitudinal direction, conveying the first product in the longitudinal direction in the first lane, conveying the second product in the longitudinal direction in the second lane, and conveying the third product in the longitudinal direction in the third lane;

the first lane is positioned between the second and third lanes;

the pusher is a downstream pusher; and
the system further comprises
an upstream pusher mounted for being moved laterally relative to the conveying surface for moving the third product laterally from the first lane to the third lane, and
an interlock for causing the first and downstream pushers to substantially simultaneously move in opposite directions from one another.

8. A system for at least partially grouping a plurality products, the system comprising:
at least one conveyor for
conveying the plurality of products downstream in a longitudinal direction in a longitudinally extending first lane so that first, second and third subgroups of products are substantially aligned with one another and arranged in series in a first lane,
conveying the second subgroup of products downstream in the longitudinal direction in a second lane, and
conveying the third subgroup of products downstream in the longitudinal direction in a third lane; and
at least one obstructor mounted for being movable between obstructing and unobstructing positions, wherein
in the obstructing position the at least one obstructor arrests downstream travel of the first subgroup of products in the first lane, and
in the unobstructing position the at least one obstructor allows downstream travel of the first subgroup of products in the first lane;
downstream and upstream pushers each being mounted for being reciprocated back and forth across the first lane in a lateral direction that extends crosswise to the longitudinal direction, the downstream pusher being positioned between the obstructor and the upstream pusher; and
at least one control system operatively associated with the downstream and upstream pushers for causing the downstream and upstream pushers to substantially simultaneously move across the first lane in opposite directions from one another for moving the second and third subgroups of products respectively to the second and third lanes.

9. The system according to claim 8, wherein the at least one conveyor comprises a conveying surface, the conveying surface being configured for each of:
conveying the plurality of products downstream in the longitudinal direction in the longitudinally extending first lane so that the first, second and third subgroups of products are substantially aligned with one another and arranged in series in the first lane,
conveying the second subgroup of products downstream in the longitudinal direction in the second lane, and
conveying the third subgroup of products downstream in the longitudinal direction in the third lane.

10. The system according to claim 8, comprising:
a holding station that includes the at least one obstructor positioned proximate an end of a pair of longitudinally extending and laterally spaced apart guides of the holding station;
a downstream shuttle that includes the downstream pusher positioned between a pair of longitudinally extending and laterally spaced apart guides of the downstream shuttle; and
an upstream shuttle that includes the upstream pusher positioned between a pair of longitudinally extending and laterally spaced apart guides of the upstream shuttle.

11. The system according to claim 8, wherein the at least one control system comprises an actuator operatively connected to both of the downstream and upstream pushers by way of a linkage configured for causing the downstream and upstream pushers to substantially simultaneously move across the first lane respectively in opposite directions for moving the second and third subgroups of products respectively to the second and third lanes.

12. The system according to claim 8, wherein the at least one control system comprises:
at least one actuator operatively connected to the downstream and upstream pushers for causing the downstream and upstream pushers to move across the first lane respectively in opposite directions for moving the second and third subgroups of products respectively to the second and third lanes; and
at least one controller operatively associated with the at least one actuator for causing the at least one actuator to move the downstream and upstream pushers across the first lane at least in response to determining that the first, second and third subgroups of products are contained within a predetermined section of the first lane.

13. The system according to claim 8, wherein the at least one control system is operatively associated with the at least one obstructor for causing the at least one obstructor to transition from the obstructing position to the unobstructing position at least in response to the first and second subgroups of products becoming arranged substantially laterally side-by-side with one another.

14. The system according to claim 8, wherein the at least one control system is operatively associated with the at least one obstructor for causing the at least one obstructor to transition from the unobstructing position to the obstructing position at least in response to the first subgroup of products reaching a predetermined position in the first lane.

15. A method of at least partially grouping a plurality products, the method comprising:
moving the plurality of products in a longitudinal direction in a longitudinally extending first lane so first, second and third products of the plurality of products are substantially aligned with one another and arranged in series in the first lane, so that the second product is behind the first product in the longitudinal direction, and the third product is behind the second product in the longitudinal direction;
moving the second product laterally from the first lane to a longitudinally extending second lane that is adjacent to and extends along the first lane; and
moving the third product laterally from the first lane to a longitudinally extending third lane that is adjacent to and extends along the first lane, wherein
the first lane is positioned between the second and third lanes, and
the moving of the second product laterally from the first lane to the second lane occurs substantially simultaneously with the moving of the third product laterally from the first lane to the third lane.

16. The method according to claim 15, further comprising causing relative movement in the longitudinal direction between the first product in the first lane and the second product in the second lane to reduce how far the second product is behind the first product in the longitudinal direction.

17. The method according to claim 16, wherein the causing of the relative movement in the longitudinal direction between the first product in the first lane and the second product in the second lane causes the first and second products to become arranged substantially laterally side-by-side with one another to at least partially form a group of the products.

18. The method according to claim 16, wherein:
the causing of the relative movement in the longitudinal direction between the first product in the first lane and the second product in the second lane comprises causing the second product to catch up to the first product, and
the method further comprises causing the third product to catch up to the first and second products to at least partially form a group of the products.

19. The method according to claim 16, wherein:
the moving of the plurality of products in the longitudinal direction in the first lane comprises moving the plurality of products in the longitudinal direction in the first lane so first, second and third subgroups of products of the plurality of products are substantially aligned with one another and arranged in series in the first lane;
the first subgroup of products includes the first product;
the second subgroup of products includes the second product;
the third subgroup of products includes the third product;
the moving of the second product laterally comprises moving the second subgroup of products laterally from the first lane to the second lane;
the moving of the third product laterally comprises moving the third subgroup of products laterally from the first lane to the third lane; and
the causing of the relative movement in the longitudinal direction comprises causing relative movement in the longitudinal direction between each of the first, second and third subgroups of products so that the first, second and third subgroups of products become arranged substantially laterally side-by-side with one another to at least partially form a group of the products.

20. The method according to claim 16, wherein the causing of the relative movement in the longitudinal direction between the first product in the first lane and the second product in the second lane comprises:
restricting movement of the first product in the longitudinal direction in the first lane; and
moving the second product in the longitudinal direction in the second lane.

21. The method according to claim 20, wherein:
the restricting of the movement of the first product comprises holding the first product stationary in the first lane; and
the holding of the first product stationary in the first lane and the moving of the second product in the longitudinal direction in the second lane occur substantially simultaneously.

22. The method according to claim 20, wherein the restricting of the movement of the first product comprises holding the first product stationary in the first lane, and the method further comprises:
ceasing to hold the first product stationary in the first lane in response to the second product becoming arranged substantially laterally side-by-side with the first product; and
then substantially simultaneously moving the first product in the longitudinal direction in the first lane and continuing the moving of the second product in the longitudinal direction in the second lane so that the first and second products remain arranged substantially laterally side-by-side with respect to one another while together moving in the longitudinal direction.

23. A method of at least partially grouping a plurality products, the method comprising:
moving the plurality of products in a longitudinal direction in a longitudinally extending first lane so first and second products of the plurality of products are substantially aligned with one another and arranged in series in the first lane, so that the second product is behind the first product in the longitudinal direction;
moving the second product laterally from the first lane to a longitudinally extending second lane that is adjacent to and extends along the first lane;
then causing relative movement in the longitudinal direction between the first product in the first lane and the second product in the second lane to reduce how far the second product is behind the first product in the longitudinal direction; wherein
the moving of the plurality of products in the longitudinal direction in the first lane comprises longitudinally moving a conveying surface carrying the plurality of products in the longitudinal direction;
the moving of the second product laterally from the first lane to second lane comprises laterally sliding the second product on the longitudinally moving conveying surface;
the causing of the relative movement in the longitudinal direction between the first product in the first lane and the second product in the second lane comprises substantially simultaneously
holding the first product back in the longitudinal direction so that there is sliding contact between the first product and the longitudinally moving conveying surface, and
the longitudinally moving conveying surface carrying the second product in the longitudinal direction in the second lane; and
the method further comprises
ceasing the holding back of the first product in response to the first and second products becoming arranged substantially laterally side-by-side with one another, and
thereafter the longitudinally moving conveying surface carrying the first and second products in the longitudinal direction respectively in the first and second lanes.

24. A method of at least partially grouping a plurality products, the method comprising:
moving the plurality of products in a longitudinal direction in a longitudinally extending first lane so first, second and third subgroups of products of the plurality of products are substantially aligned with one another and arranged in series in the first lane;
moving the second subgroup of products laterally from the first lane to a longitudinally extending second lane that is adjacent to and extends along the first lane;
moving the third subgroup of products laterally from the first lane to a longitudinally extending third lane that is adjacent to and extends along the first lane, wherein
the first lane is positioned between the second and third lanes, and
the moving of the second subgroup of products laterally from the first lane to the second lane occurs substantially simultaneously with the moving of the third subgroup of products laterally from the first lane to the third lane; and
then causing relative movement in the longitudinal direction between the first, second and third subgroups of products so that the first, second and third subgroups of products become arranged substantially laterally side-by-side with one another to at least partially form a group of the products.

25. The method according to claim 24, wherein the causing of the relative movement in the longitudinal direction between the first, second and third subgroups of products comprises substantially simultaneously:
   restricting movement of the first subgroup of products in the longitudinal direction in the first lane;
   moving the second subgroup of products in the longitudinal direction in the second lane; and
   moving the third subgroup of products in the longitudinal direction in the third lane.

26. The method according to claim 25, wherein:
   the moving of the plurality of products comprises conveying the first subgroup of products in the longitudinal direction in the first lane;
   the conveying of the first subgroup of products comprises moving a conveying surface in the longitudinal direction so that the conveying surface carries the first subgroup of products in the longitudinal direction in the first lane; and
   the restricting of the movement of the first subgroup of products comprises restricting the conveying of the first subgroup of products so that there is sliding contact between the first subgroup of products and the conveying surface moving in the longitudinal direction.

27. The method according to claim 25, wherein the method further comprises:
   ceasing the restricting of movement of the first subgroup of products in the longitudinal direction in the first lane in response to the second subgroup of products becoming arranged substantially laterally side-by-side with the first subgroup of products; and
   then substantially simultaneously moving the first subgroup of products in the longitudinal direction in the first lane and continuing the moving of the second subgroup of products in the longitudinal direction in the second lane so that the first and second subgroup of products remain arranged substantially laterally side-by-side with respect to one another while together moving in the longitudinal direction.

28. The method according to claim 25, wherein the causing of the relative movement in the longitudinal direction between the first, second and third subgroups of products comprises substantially simultaneously:
   restricting movement of the first subgroup of products in the longitudinal direction in the first lane;
   restricting movement of the second subgroup of products in the longitudinal direction in the second lane; and
   moving the third subgroup of products in the longitudinal direction in the third lane.

* * * * *